United States Patent Office 3,264,157
Patented August 2, 1966

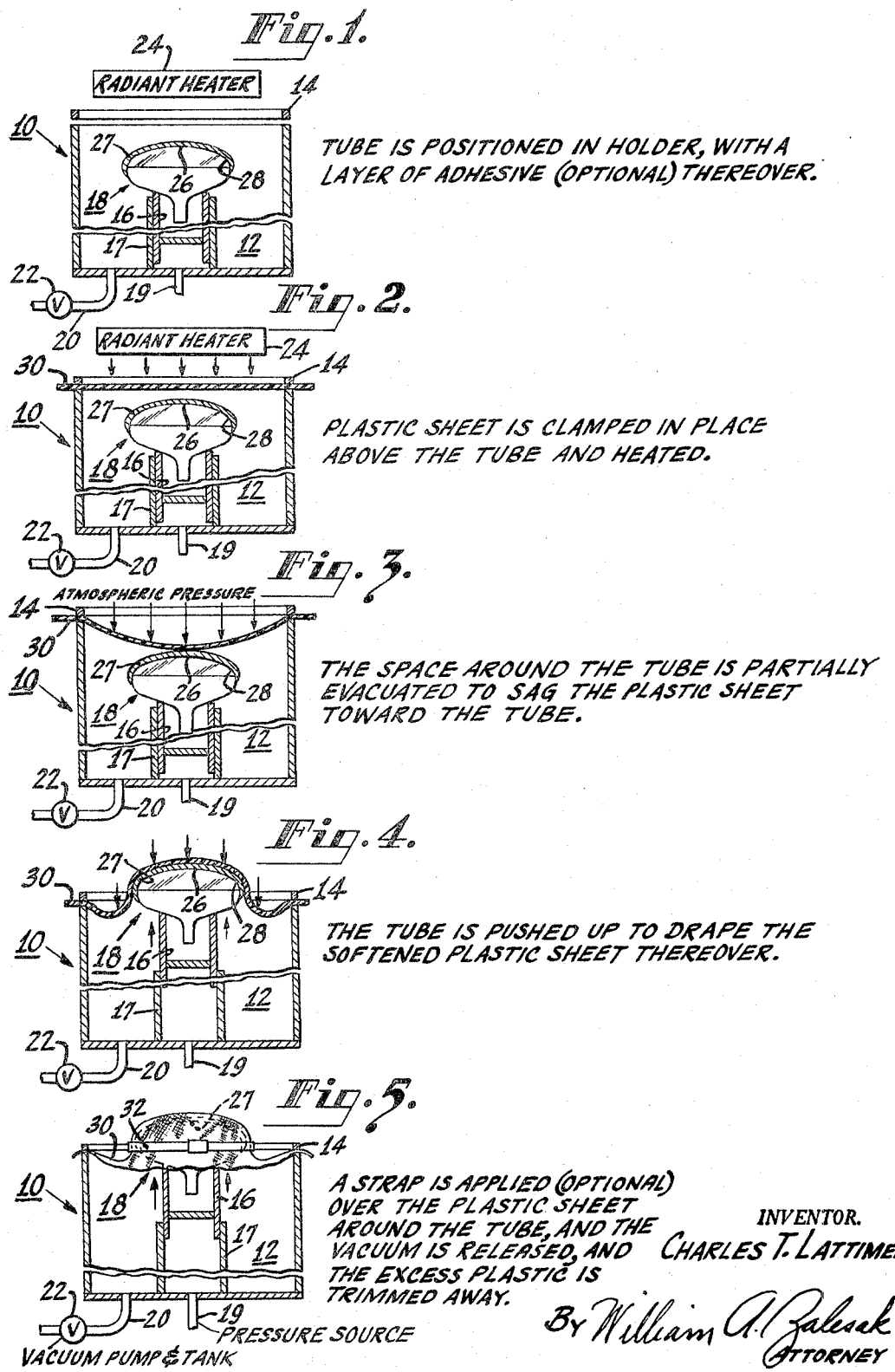

3,264,157
CATHODE RAY TUBE FABRICATION
Charles T. Lattimer, Marion, Ind., assignor to Radio Corporation of America, a corporation of Delaware
Filed Nov. 13, 1961, Ser. No. 151,658
6 Claims. (Cl. 156—212)

This invention relates to an improved method of draping a sheet of plastic material over portions of a cathode ray tube to protect a viewer from flying glass fragments in case of a tube implosion and to otherwise reduce the violence of a tube implosion.

Although other kinds of plastic sheet film may be used, polyethylene terephthalate film, known in the trade as "Mylar," has been found to be particularly desirable for this type of implosion-proofing.

In order to obtain the most satisfactory product in implosion-proofing by plastic sheet draping, it is necessary to provide a draping in which air bubbles are not trapped between the cathode ray tube faceplate and the plastic sheet. The plastic sheet should be in continuous optical contact with the faceplate. Avoidance of entrapped air bubbles when using prior art draping techniques is not easily or consistently obtainable. This is especially true when a liquid adhesive is used between the faceplate and the plastic sheet in the effort to obtain maximum adhesion, good optical contact between the plastic sheet and the faceplate, and maximum insurance against flying glass fragments in case of an implosion. The adhesive, applied in liquid form, provides a medium in which air bubbles are readily formed and entrapped.

It is therefore an object of this invention to provide a new and improved method of applying plastic sheet material to portions of a cathode ray tube, wherein formation and entrapment of air bubbles between the tube and the plastic sheet are reduced or entirely avoided.

According to the invention, a cathode ray tube and a plastic sheet are supported in spaced relationship. The plastic sheet is heated to soften it, and while yet spaced from the tube, a pressure differential is established on the opposite sides of the plastic sheet so as to sag the plastic sheet toward the cathode ray tube. The pressure differential is preferably established by creating a partial vaccum on the tube side of the plastic sheet. After a pressure differential is established, the cathode ray tube and plastic sheet are then moved toward and into contact with each other to drape the plastic sheet over a portion of the tube. If desired, an adhesive material may be applied between the tube and the plastic sheet prior to the draping process or a compression strap may be applied around the tube subsequent to the draping process to clamp the plastic sheet to the tube. Alternatively the adhesive and strapping both may be used.

In the drawings:

FIGS. 1, 2, 3, 4, and 5 are views illustrating successive steps in the practice of this invention together with one embodiment of apparatus suitable therefor.

One form of apparatus suitable for the practice of this invention includes a housing 10 having an open top which can be closed with a plastic sheet to form an evacuable chamber 12. A clamping ring 14 adjacent the opening of the housing is provided for clamping a plastic sheet across the opening. Tube support means 16 is provided centrally within the housing 10 for receiving a cathode ray tube 18 in a neck-down position. As shown in a highly schematic way, support means 16 is vertically slidable in a cylinder 17 and is pneumatically actuable through an air pressure line 19 to raise the cathode ray tube 18 upwardly as illustrated in FIG. 4. A vacuum line 20 having a valve 22 therein connects the chamber 12 to a vacuum pump through a vacuum tank (not shown). The vacuum pump and tank make possible a rapid partial evacuation of the chamber 12 upon an opening of the valve 22. A movable radiant heater 24 (FIG. 2) is spaced above the clamping ring 14 and is adapted to heat a plastic sheet clamped by the ring 14 to a softened condition for a subsequent draping operation.

As shown in FIG. 1, a cathode ray tube 18 is positioned in the tube support 16 with its faceplate 26 oriented upwardly. A thin layer 27 of a suitable adhesive may be applied over the faceplate and part-way down the adjacent side wall 28 of the tube 18. Certain types of epoxy resins are known which have been found suitable as adhesives for this purpose.

As shown in FIG. 2, a plastic sheet 30 is mounted across the opening of the housing 10 and clamped in place by the clamping ring 14. In the case where the cathode ray tube 18 is, for example, a conventional 21 inch bulb, the plastic sheet 30 may be spaced about 6 to 8 inches, for example, above the faceplate 26. The plastic sheet 30 may be provided of various materials; however, a polyethylene terephthalate film of about 6 mils thickness is preferred. Polyethylene terephthalate films of from 5 to 10 mils have been successfully used in the practice of this invention.

With the plastic sheet 30 in place as shown in FIG. 2, the radiant heater 24 is energized to heat and suitably soften the plastic sheet 30. After the plastic sheet 30 has been heated to bring about the desired softness, the radiant heater 24 is then moved out of heat transfer relation with the plastic sheet 30 so as not to heat the sheet above the desired softened condition.

Referring to FIG. 3, immediately after the plastic sheet 30 has been brought to the desired softness, the valve 22 in the vacuum line 20 is opened and a partial vacuum established in the chamber 12 to effect a sagging of the plastic sheet 30 downwardly toward the cathode ray tube 18. The sagging is such that the lowest point of the sagged plastic sheet 30 is disposed centrally above the faceplate 26 and is either very closely spaced relative thereto or makes a small area contact therewith. A partial vacuum which produces a pressure differential of about 12 to 14 lbs. per square inch on the opposite sides of the plastic sheet 30 has been found suitable for providing the desired sag of the plastic sheet. A sag of about ¼ the distance which the plastic sheet spans between opposite sides of the clamping ring 14 has been found to be suitable. In the case of a conventional 21 inch, 23 inch, or 24 inch cathode ray tube processed in a housing 10 having a clamping ring with an opening of about 27 by 30 inches, a sag of the plastic sheet at its center of about 7 inches has been used. In draping a conventional 14 inch, 17 inch, or 19 inch tube, using a clamping ring with an opening of 19 by 21 inches, a sag of about 6 inches has been used. It is presently thought that a sag of about ¼ the span of the sheet is a good operative criterion.

Referring to FIG. 4, after the softened plastic sheet 30 has been sagged due to the partial vacuum in the chamber 12, the cathode ray tube 18 is moved upwardly by the tube support means 16 to engage the sagged plastic sheet 30 and drape it over the faceplate 26 and the side wall portion 28. Since the plastic sheet 30 and the radiant heater 24 are no longer in heat transfer relation with each other, the draping of the plastic sheet over the cathode ray tube is performed quickly after the plastic sheet has been sagged in order to avoid an undesirable cooling of the plastic sheet prior to the draping thereof. In practice, it has been found preferable to begin an upward motion of the cathode ray tube 18 almost immediately upon completion of the sagging operation and to thereafter complete the upward movement of the tube 18 in about one second.

Since the softened plastic sheet 30 is sagged prior to the draping operation, the draping is characterized by the initiation of a small area contact between the plastic sheet 30 and the faceplate 26 and then a subsequent outward expansion or growth of this contact until the drape is completed. Such expansion of the initial small area contact occurs, in effect, as a rolling of the plastic sheet 30 radially outwardly onto the faceplate 26 and then down the side wall portion 28. This rolling action, which is made possible by the presagging of the plastic sheet 30, avoids wrinkling of the plastic sheet 30 and reduces the possibility of forming air pockets between the plastic sheet 30 and the tube 18 as the plastic sheet is draped over the tube. The rolling application of the plastic sheet onto the tube also eliminates air bubbles which may exist in the adhesive layer 27—or in the absence of the adhesive layer simply between the plastic sheet and the tube—by rolling them out in a squeegee-like operation.

Because the draping operation is performed in a partial vacuum, formation and existence of air bubbles in the adhesive layer 27 are reduced. Air bubbles which might otherwise exist, burst and disappear because they were originally entrapped at atmospheric pressure and now are in a rarefied atmosphere. Thus, the air pressure of the bubbles is greater than that of the rarefied atmosphere around the resin. Therefore, the possibility of air bubbles being trapped between the plastic sheet 30 and the cathode ray tube 18 during the draping operation is still further reduced.

The presagging of the plastic sheet 30 prior to draping it over the cathode ray tube 18 need not be performed by creating a partial vacuum on the tube side of the plastic sheet. Instead, a higher than atmospheric pressure may be created on the side of the plastic sheet opposite the cathode ray tube 18 to thereby establish a pressure differential which will cause the plastic sheet to be sagged toward the cathode ray tube. However, the partial vacuum method is preferred, because application of a higher than atmospheric pressure, while obtaining the advantage of bubble reduction due to a rolling application of the plastic sheet to the tube, does not also obtain the advantage of bubble breaking and reduction due to a rarefied atmosphere.

Referring to FIG. 5, the implosion-proofing process may be completed by the application of a compression strap 32 around the side wall portion 28 of the cathode ray tube 18 to clamp the plastic sheet 30 tightly thereto. The strap 32 may, for example, comprise a steel band, a nylon web, or other suitable means which is tightened around the hoop with about 1,000 pounds tension therein. Use of the strap 32 serves not only to clamp the plastic sheet 30 to the tube 18 but also to compressively stress the side wall portion 28 of the tube 18 to remove tensional stresses therein and thus make the cathode ray tube bulb more resistant to shock and physical abrasion. Use of the clamping strap 32, while highly desirable, is nevertheless optional.

After application of the clamping strap 32, the partial vacuum in the chamber 12 is released and the excess of the plastic sheet 30 is trimmed away from the cathode ray tube 18 at a line just below, and adjacent to, the clamping strap 32.

What is claimed is:

1. The method of applying a plastic sheet to a portion of a cathode ray tube comprising the steps of disposing said sheet in spaced relation with said tube portion, heating said sheet to soften it, creating a partial vacuum on the tube side of said sheet while said sheet is spaced from said tube to sag said sheet toward said tube, and then moving said tube and sheet together to contact approximately the central part of said tube portion with the closest part of the sagged portion of said sheet in a small initial area and then to outwardly expand said contact in a rolling-like action over said tube portion.

2. The method as recited in claim 1, wherein said heating is terminated prior to creating said pressure differential.

3. The method of applying a plastic sheet to a portion of a cathode ray tube comprising the steps of peripherally supporting said sheet and disposing it in spaced relation with said tube portion at a distance therefrom equal to about ¼ the span of said sheet between opposite points of its peripheral support, heating said sheet to soften it, creating a partial vacuum on the tube side of said sheet while said sheet is spaced from said tube to sag said sheet into contact with the central portion of said tube in a small initial area and then moving said tube and sheet together to outwardly expand said contact in a rolling-like action over said tube portion.

4. The method of covering a portion of a cathode ray tube with a sheet of polyethylene terephthalate film comprising the steps of coating said tube portion with a layer of adhesive, disposing said sheet in spaced relation with and facing said tube portion, heating said sheet to soften it, partially evacuating the space on the tube side of said sheet around said tube portion to produce a pressure differential of 12 to 14 pounds per square inch on the opposite sides of said sheet while said sheet is spaced from said tube to sag said softened sheet toward said tube portion, and then moving said tube toward said sheet to contact the central part of said tube portion with the closest part of the sagged portion of said sheet in a small initial area and then to outwardly expand said contact in a rolling-like action over said tube portion.

5. The method of applying a plastic sheet over the faceplate and adjacent side wall portion of a cathode ray tube comprising the steps of spacing said sheet in facing relation with said faceplate, heating said sheet to soften it, creating a pressure difference on the opposite sides of said sheet to sag it toward said faceplate, and then moving said tube and said sagged sheet toward each other to first establish a small area contact between the central portion of said faceplate and the closest portion of said sagged sheet and then to outwardly expand said contact over said faceplate and down said adjacent side wall portion in a rolling-like squeegee action, whereby said sheet is draped over said faceplate and said adjacent side wall portion.

6. The method of applying a sheet of polyethylene terephthalate film over the faceplate and adjacent side wall portion of a cathode ray tube comprising the steps of coating said faceplate and said adjacent side wall portion with a layer of adhesive, disposing said sheet substantially parallel to and in spaced relation with said faceplate, heating said sheet to soften it, creating a partial vacuum on the tube side of said sheet in the space around said faceplate and said adjacent side wall portion to sag said sheet toward said faceplate, and then bringing said tube and said sagged sheet together to contact the central portion of said faceplate with said sagged sheet in a small area thereof and continuing the relative movement of said tube and said sagged sheet to increase the area of contact therebetween in an outwardly expanding area by a rolling-like squeegee action to completely drape said sheet over said faceplate and said adjacent side wall portion.

References Cited by the Examiner

UNITED STATES PATENTS

| 2,660,757 | 12/1953 | Smith et al. |
| 2,828,799 | 4/1958 | Harrison. |
| 3,026,232 | 3/1962 | Finch _____ 156—285 XR |
| 3,067,082 | 12/1962 | Leigh _____ 156—213 |

ALEXANDER WYMAN, *Primary Examiner.*

EARL M. BERGERT, *Examiner.*

M. E. ROGERS, W. J. VAN BALEN, *Assistant Examiners.*